Oct. 16, 1956 C. J. MANVILLE 2,767,019
DISH WASHING DEVICE INCLUDING FLUID SHUTOFF VALVE
Filed July 1, 1955
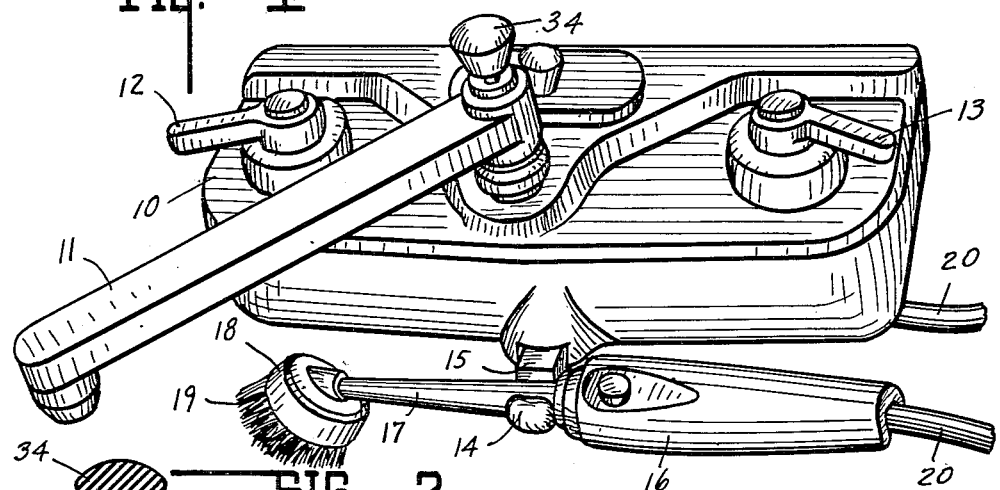
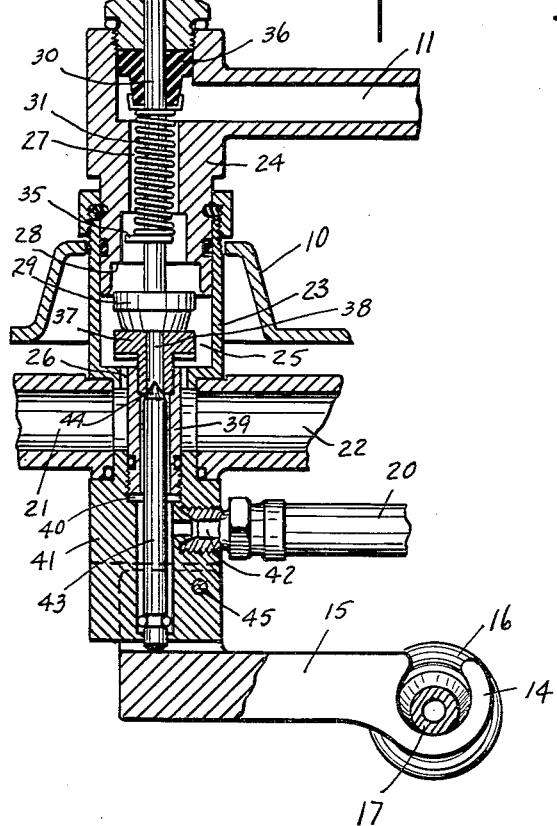
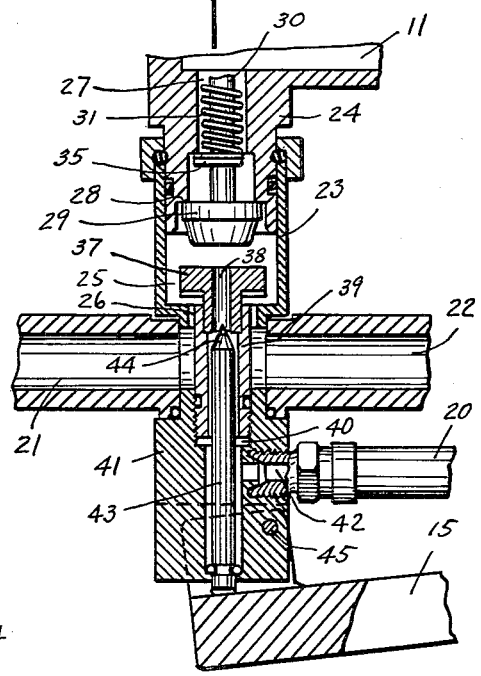
INVENTOR.
CHARLES J. MANVILLE.
BY
Lockwood, Galt, Woodard & Smith
ATTORNEYS.

United States Patent Office 2,767,019
Patented Oct. 16, 1956

2,767,019

DISH WASHING DEVICE INCLUDING FLUID SHUTOFF VALVE

Charles J. Manville, Pontiac, Mich., assignor to Manville Manufacturing Corporation, Pontiac, Mich., a corporation Application July 1, 1955, Serial No. 519,585

6 Claims. (Cl. 299—58)

This invention relates to a fluid shutoff valve, and particularly such a valve associated with a fluid control valve as applied to a dish washing device generally of the character shown and disclosed in Letters Patent No. 2,710,020, patented June 7, 1955, entitled "Fluid Control Valve."

In such dish washing devices there is provided what may be termed a primary outlet in the nature of the usual spout connected by a passage with a hot and cold water manifold which in turn is connected with a source of water supply under pressure. A second passage connected with said manifold is provided through which water is diverted from the spout through a flexible tube terminating in a control handle carrying a spray head and brush. A suitable diverter valve is employed which is alternately governed by spring pressure and water pressure so that when manually raised to one position against spring pressure, it will be held in such position by the water pressure to divert the water from the manifold through the passage to the spray head. When the water pressure is shut off to relieve the pressure on the valve, the spring will return it to its normal position, whereby the water passage to the spout will be again opened.

It is the purpose of this invention to provide a fluid shutoff valve operating in conjunction with the diverter valve to temporarily shut off tempered water, of a set temperature, to the spray head upon laying a spray head handle in a suitable holder. Thus, when the diverter valve is in position for diverting the water to the spray head it may be manipulated in the usual manner, such as to wash and rinse dishes. But in event it is desired to temporarily discontinue the operation and without closing the mixing valves or changing the position of the diverter valve, the spray head handle may be placed in its holder, the weight thereof causing the holder to operate the shutoff valve to discontinue water supply to the spray head. Upon removing the spray head handle for further washing or rinsing, the pressure of the water in the manifold will cause the shutoff valve to open. Thus, a convenient arrangement is provided for temporarily shutting off the tempered water to the spray head by merely resting the handle on the holder and without changing the position of the diverter valve or the water supply mixing valves after having been set to deliver water of the desired temperature.

The full nature of the invention will be understood from the accompanying drawings and the following description and claims:

Fig. 1 is a perspective view of a dish washing device embodying the invention, showing the spray head handle in water shutoff position.

Fig. 2 is a central vertical section through the diverter and shutoff valves, with portions in elevation, showing the shutoff valve in closed position and the diverter valve in position for directing water through the spout.

Fig. 3 is the same as Fig. 2, with parts removed, showing the diverter valve in position to divert water from the manifold through the spray head and with the shutoff valve in open position.

In the drawings, for the purpose of illustrating one modification of the invention, there is shown a dish washing device including a housing 10 carrying a swivel spout 11 and the hot and cold water control and mixing valves 12 and 13. Extending forwardly from the housing 10 there is a spray control handle receiving support 14 carried by a valve control lever 15 arranged to receive and support a control handle 16, including a mounting tube 17 terminating in a spray head 18 and brush 19. The control handle is connected through a flexible rubber hose 20 with a hot and cold water mixing and tempering manifold as hereinafter described.

Within the housing 10 there is provided a water supply and mixing manifold including a conduit 21 leading from the source of hot water and controlled by the valve 12, and a conduit 22 leading from the source of said water controlled by the valve 13, the source of the water supply thereto being under pressure. Extending upwardly from the manifold there is a fixture 23 which supports and seats for rotation therein a spout supporting swivel head 24. The chamber 25 within the fixture 23 communicates with the manifold through a plurality of ports 26, permitting water to pass therethrough into said chamber and from said chamber through a bore 27 into the spout 11 for discharge in the usual manner.

The swivel head is provided with a valve seat 28 against which a diverter valve 29 is adapted to seat, as shown in Fig. 3. For seating the diverter valve 29 against the valve seat 28 there is provided a diverter rod 30 extending upwardly through the bore 27 and carrying a manipulating knob 34. A compression spring 31 surrounds the rod bearing at one end upon a spring retainer 35 secured thereto and at the other end against a sealing gasket 36 fixedly mounted in the swivel head of the spout. Said spring is adapted to bias the diverter valve 29 to its lower position, as shown in Fig. 2, for opening the passage to the spout 11. However, upon the diverter valve being manually raised against the tension of said spring by the knob 34, it will remain in its raised passage closing position as long as there is water pressure in the chamber 25. Thus, when one or both valves 12, 13 are open, and with the diverter valve in its lower position under spring tension, as shown in Fig. 2, water will flow from the manifold through the ports 26, chamber 25, past the valve 29 and valve seat 28, through the bore 27 to be discharged through spout 11.

When it is desired to place the spray head and brush in operation, the diverter valve is manually raised by the knob 34 against the bias of the spring 27 until it seats against the valve seat 28. Thereupon, assuming that one or the other valve 12, 13 is open, water pressure in the manifold and chamber 25 will be exerted against the valve to retain it in its seated position against the tension of spring 31. This position of the valve will be maintained until the valves 12, 13 are closed, whereupon the drop in water pressure will permit spring 31 to again return the diverter valve to its initial open position.

When the diverter valve is raised to close off the bore 27, it is unseated from the valve head 37. Said valve head, which is positioned in the chamber 25, is provided with a central bore 38. Water will then be diverted from the spout so as to pass through the chamber 25 and the bore 38 and into a valve nipple 39 and into a chamber 40 provided in a valve fixture 41. A secondary outlet 42 is provided in said valve fixture with which the hose 20 leading to the spray control handle 16 is connected. Water from the manifold will thereupon be diverted from its normal flow through the spout 11 to flow through the spray head 18.

Slidably mounted in the valve fixture 41 and nipple 39, there is a fluid shutoff valve comprising a stem 43 terminating in a needle valve 44 adapted to extend into and close the bore 38 of the valve head 37 when in its uppermost position, and upon said bore in its lowermost position. The lever 15 of the control handle receiving support 14 is fulcrumed on said valve at 45 to bear against the lower end of the valve stem. When the weight of the control handle is carried by said support 14, it will lift the valve stem upwardly to seat the needle valve 44 and close the bore 38, thus preventing the flow of water from the manifold through the secondary outlet 42 leading to the spray head. When the control handle is removed for use, the water pressure of the bore 38, coupled with the weight of the valve stem, will cause it to drop down to valve open position, as shown in Fig. 3.

When not in use, the dish washing device carries the control handle, as shown in Figs. 1 and 2, with the diverter valve in the position of Fig. 2. When one or the other of valves 12, 13 is turned on, water from the pressure source readily is permitted to pass through and discharge from the spout 11 in the normal manner. When it is desired to use the spray head and brush, the control handle 16 is removed from its support 14 and the diverter valve is raised to the position shown in Fig. 3, in which position it is held by water pressure in the chamber 25. Thus, the water passage to the spout is closed and the passage through the valve head 37 and its bore is opened. The handle being removed, the shutoff valve 43, 44 will be in its lowermost position, as shown in Fig. 3, to freely permit passage of water through the secondary outlet 42, spray head and brush.

It is usually desirable to have a suitable temperature of water which is obtained by manipulating the valves 12, 13. Having once attained this desired water temperature, it should not be disturbed in event that one may desire to discontinue the spray head operation temporarily. In such event it is only necessary to place the control handle back in the support 14, whereupon the water will be completely shut off without disturbing the water temperature setting of the valves 12, 13. When it then becomes desirable to again use the spray head and brush with the water at the set temperature, it is only necessary to again remove the control handle from its support to permit the shutoff valve to open.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a valve structure, the combination with a manifold connected with a source of water pressure and having a primary outlet and a secondary outlet, of a spray head connected with said secondary outlet having a control handle including a mounting tube for said spray head, a diverter valve movable to one position to open a passage from said manifold to said secondary outlet and close the passage to said primary outlet, a shutoff valve for opening and closing the passage to said secondary outlet independently of said diverter valve, and a control handle receiving support operably associated with said shutoff valve to move it to passage closing position upon said handle being received thereby to permit movement thereof to passage opening position upon said handle being removed.

2. In a valve structure, the combination with a manifold connected with a source of water under pressure and of different temperatures, mixing valves for controlling the temperature of water in said manifold, a water dispensing spout having a flow passage thereto connected with said manifold, a spray head connected with said passage having a control handle including a mounting tube for said head, a diverter valve biased in position to open the passage to said spout, manually operable means for moving said diverter valve to close the passage to said spout and open the passage to said spray head, a needle valve in the passage to said spray head having an elongated valve stem movable to close the passage to said spray head independently of the position of said diverter valve, and a control handle receiving support operably associated with said valve stem to move it to passage closing position upon said handle being received thereby and permit movement thereof to passage opening position to said spray head upon said handle being removed, whereby the flow of tempered water through said spray head may be controlled by said support independently of said mixing valves.

3. In a valve structure, the combination with a manifold connected with a source of water under pressure and of different temperatures, mixing valves for controlling the temperature of water in said manifold, a water dispensing spout having a flow passage thereto connected with said manifold, a spray head connected with said passage having a control handle including a mounting tube for said head, a diverter valve biased in position to open the passage to said spout, manually operable means for moving said diverter valve to close the passage to said spout and open the passage to said spray head, a needle valve in the passage to said spray head having an elongated valve stem movable to close the passage to said spray head independently of the position of said diverter valve, and a lever fulcrumed on said manifold having one end engageable with said valve stem and the other end providing a support for receiving said control handle, said lever moving to shift said valve stem and needle valve to passage closing position upon supporting said control handle and permitting said stem and needle valve to move to passage opening position upon removal thereof, whereby the passage of tempered water through said spray head may be controlled independently of said valves.

4. In a dish washing device including a hot and cold water manifold connected with a source of water pressure, mixing valves controlling the water supply to said manifold to control the temperature thereof, a water discharge spout communicating with a flow passage from said manifold, a spray head connected with said flow passage having a control handle including a mounting tube for said spray head, a valve seat in the passage communicating with said spout, an opposed valve seat communicating with a passage communicating with said spray head, a diverter valve movable between said valve seats to open one passage and close the other, a valve stem on said diverter valve having an exposed manipulating handle for manually moving said valve against spring tension to a position for closing the passage to said spout and be retained in said position under water pressure and thereby open the passage to said spray head, said valve being movable under spring tension to seat on said second-mentioned valve seat to close the passage to said spray head upon a predetermined drop in water pressure, a needle valve having an elongated stem movable to and from passage closing position in the passage to said spray head, and a control handle receiving support operably associated with said valve stem to move it to passage closing position upon said handle being received thereby and permit movement thereof to passage opening position upon said handle being removed, whereby the flow of tempered water through said spray head may be controlled by said support independently of said mixing valves.

5. In a dish washing device, the combination with a manifold connected with a source of hot and cold water under pressure, mixing valves for tempering the water flowing in said manifold, a discharge spout connected with said manifold, a spray head connected with said manifold having a control handle including a mounting tube for said spray head, a diverter valve operable to control the flow of tempered water from said manifold through said spout when in one position and through said spray head when in another position, a shutoff valve operable independently of said diverter and mixing valves, and a lever fulcrumed on said manifold having one end operably associated with said shutoff valve and the other end providing a support for said control handle, said lever being positioned to move said shutoff valve to closed position for preventing flow of tempered water to said spray head upon said control handle being placed upon said support, and permit said valve to open for the flow of tempered water through said spray head upon said handle being removed, whereby the flow of tempered water through said spray head may be controlled by the positioning of said handle independently of said mixing valves.

6. In a dish washing device, the combination with the manifold connected with a source of hot and cold water under pressure, mixing valves for tempering the water flowing in said manifold, a discharge spout connected with said manifold, a flexible tube connected with said manifold terminating in a spray head having a control handle including a mounting tube for said spray head, flow passages from said manifold to said discharge spout and tube, a diverter valve operable to control the flow of tempered water from said manifold through said passages to said spout when in one position and said tube when in another position, and a shutoff valve operable in said manifold for controlling the passage from said manifold to said tube independently of said diverter valve and said mixing valves, said shutoff valve being operable exteriorly of said manifold to shut off the flow of tempered water to said tube when moved to one position and permit the flow thereto when moved to a second position.

References Cited in the file of this patent
UNITED STATES PATENTS

| | | |
|---|---|---|
| 2,097,871 | Davis | Nov. 2, 1937 |
| 2,508,958 | Manville | May 23, 1950 |
| 2,710,020 | Manville | June 7, 1955 |